Sept. 27, 1932.     W. N. GILBERT     1,879,183
WEIGHING SCALE INDICATOR CONTROL
Filed April 3, 1929
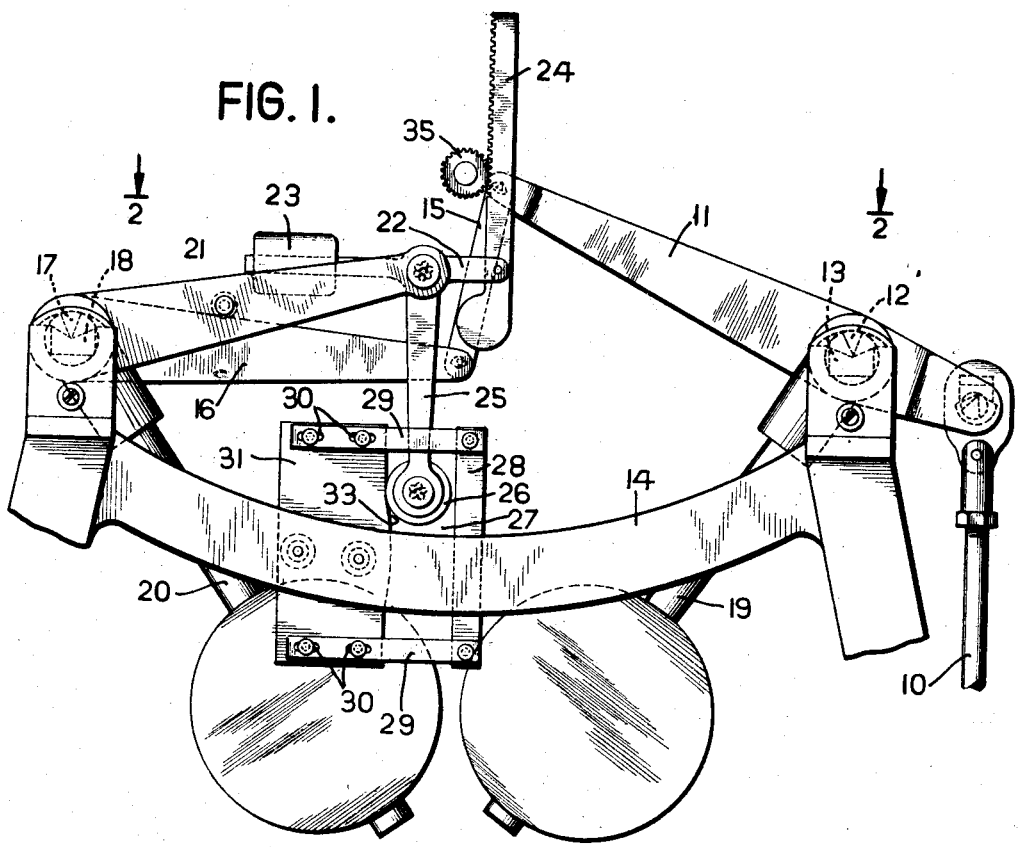
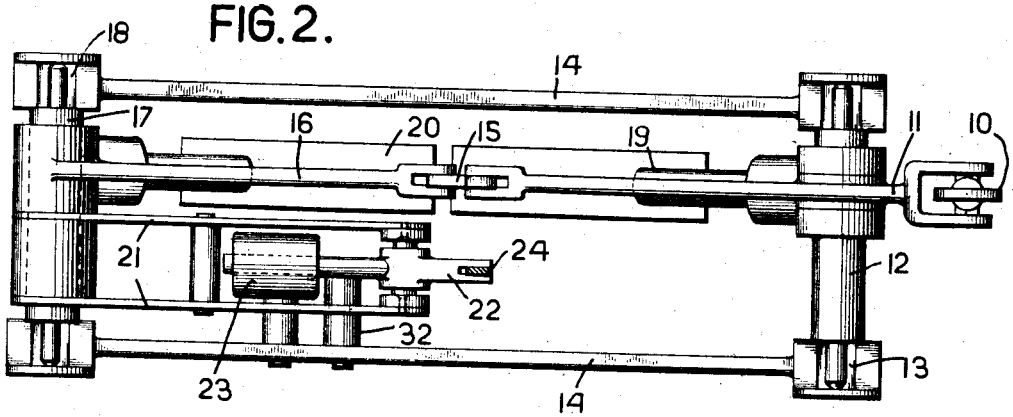
Inventor
Wm N Gilbert
By his Attorney
W. M. Wilson Patented Sept. 27, 1932

1,879,183

UNITED STATES PATENT OFFICE

WILLIAM N. GILBERT, OF HUDSON HEIGHTS, NEW JERSEY, ASSIGNOR TO DAYTON SCALE COMPANY, OF DAYTON, OHIO, A CORPORATION OF NEW JERSEY

WEIGHING SCALE INDICATOR CONTROL

Application filed April 3, 1929. Serial No. 352,236.

This case relates to weighing scales of the pendulum type.

In particular the case concerns a scale provided with pendulums supported by fixed bearings and actuated by the main levers through links rigid with the pendulum structures. In such scales, the motion of the pendulum is not uniform throughout its travel for equal increments of load, being dependent on its angular position. The problem is to drive an indicator from these pendulums uniformly for equal increments of load, such motion of the indicator being desirable and in many states required by law.

The object of this invention is to provide novel means for controlling the motion of an indicator throughout its travel.

The object is, further, to provide novel means for driving the indicator uniform distances for equal increments of load throughout the range of the indicator.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed. In the drawing, Fig. 1 is a front view of the pendulum and indicator system.

Fig. 2 is a section on line 2—2 of Fig. 1.

In detail, the load from the platform is transmitted to the pendulum system through a draft rod 10 acting on one end of a lever 11 rigid with a pendulum hub member 12 pivotally supported on a bearing 13 carried by the frame 14. The other end of lever 11 is pivoted to a link 15 which is pivoted to an arm 16 rigid with the pendulum hub member 17 pivotally supported on bearings 18 carried by frame 14. Pendulums 19 and 20 are carried by members 12 and 17 respectively. In addition, member 17 carries a pair of rigidly joined arms 21, between the outer ends of which a three-armed lever 22 is pivotally mounted preferably on roller bearings. The left hand end of the lever 22 (as viewed in the drawing) carries a poise 23, the right hand end is pivoted to a rack bar 24 while a depending arm 25 rotatably carries a roller 26. The latter is movable within a slot 27 formed by a vertical frame piece 28 joined to horizontal members 29 which are connected by pin and slot connections 30 with a frame piece 31 rigidly carried by frame 14 through pins 32.

The pin and slot connections 30 are designed to permit adjustment of the frame piece 28 so as to vary the width of the slot. Frame piece 31 has a cam edge 33 the shape of which is predetermined by the movement which it is desired to impart to the indicator. The poise 23 is adjusted to cause roller 26 to lightly contact the cam edge. The width of the slot 27 is adjusted to allow a slight play of the roller. The play occurs when a load is suddenly applied or removed, causing lever 22 to swing from its normal position shown in Fig. 1.

Cam edge 33 is shaped to give a uniform travel to the rack for equal increments of load. The rack meshes with a pinion 35 to which the pointer or chart, as the case may be, is fixed. The pendulums are normally in the position shown in Fig. 1. When a load is applied, rod 10 moves upwardly rocking the pendulums downwardly. The arms 21 rock clockwise with pendulum 20 and move the lever 22 and rack 24 downwardly, rotating the pinion 35 clockwise. As the arms 21 approach a horizontal position, the increase in vertical component of their travel is greater for the same increment of load than when the arms are further from the horizontal position. To compensate for the increased vertical travel of the arms, cam edge 33 is shaped to move roller 26 to the right as the arms 21 approach horizontal position. In moving to the right, the roller causes lever 22 to rock counterclockwise moving rack 24 upwardly and rotating the pinion 35 counterclockwise giving it a motion opposite to the clockwise motion imparted to it by the downward movement of arms 21 thus compensating for the increased movement of the indicator as arms 21 approach horizontal position. As the arms 21 continue to move downwardly past the horizontal position, the travel of the rack due to the action of arms 21 tends to decrease and this is compensated for by the rack being moved further due to the cam edge 33 permitting the roller 26 to rock lever 22 clockwise. In this manner, by properly shaping cam 33 a uniform motion may be given to the pinion 35 and the indicator carried by it. Any other desired motion may be given to the indicator by varying the shape of cam 33.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims:

I claim:

1. In a weighing scale, a pendulum, provided with an arm angularly extending relative to the pendulous portion of the pendulum, an indicator element, a device carried by said arm for actuating said element, and a cam cooperating with said device for controlling the actuation of said element.

2. In a weighing scale, a pendulum, an arm rigid with said pendulum, a device pivotally carried by said arm, a member having a cam surface, means on said device coacting with said surface to vary the movement of said device upon motion of the pendulum, and an indicator element actuated by said device.

3. In a weighing scale, a pendulum, an arm rigid with said pendulum, a device carried by said arm, an indicator element actuated by said device, and means provided with a curved stationary surface for varying the actuation of said indicator element.

4. In a weighing scale, a pendulum, an arm rigid with the pendulum, a device pivotally carried by said arm, an indicator element actuated by said device, and means for varying the actuation of said element by said device.

5. In a weighing scale, a pendulum, an arm rigid with the pendulum, a lever pivoted to said arm, an indicator element connected for actuation to said lever, and means coacting with said lever to vary the actuation of the indicator.

6. In a weighing scale, a pendulum, an arm rigid with the pendulum, a device carried by said arm, an indicator element actuated by said arm, a cam for varying the actuation of said element, and means for adjusting the position of said cam.

7. In a weighing scale, a pendulum, an arm movable in accordance with the movement of the pendulum, an indicator element actuated by said arm, means provided with a cam surface for controlling the actuation of said indicator element, and means for moving said surface parallel to itself.

8. In a weighing scale, a pendulum, an arm movable in accordance with the movement of the pendulum, an indicator element actuated by said arm, a cam, and a roller connected to said arm coacting with said cam for varying the actuation of the indicator element.

9. A scale comprising a pendulum, an arm rigid with the pendulum, a lever pivoted to said arm, an indicator element actuated by said lever, a cam, a member carried by said lever coacting with said cam to vary the actuation of the indicator element, and means for urging said member into contact with said cam.

10. A scale comprising a member actuated in accordance with the load, a device pivoted to said member including a vertically disposed rack, an indicator element actuated by said rack, and means independent of said member for varying the actuation of said element by said rack.

11. A scale comprising a member movable in accordance with the load, a device having a pivotal connection with said member, an indicator element actuated by said device, means independent of said member cooperating with said device for varying its actuation of said element, and means for adjustably mounting said first-mentioned means.

12. A scale comprising a member movable in accordance with the load, a three-armed lever pivotally connected to said member, an indicator element pivoted to one arm of said member, a cam, a device rotatably carried by another arm of said lever coacting with said cam for varying the movement of said lever, and means carried by the remaining arm of the lever for urging said device into constant engagement with said cam.

13. In a scale, an indicator, an actuator for the indicator, a pendulum counterbalance for causing movement of the actuator in a generally vertically disposed path, and a vertically disposed device coacting with the actuator for varying the aforesaid movement of the actuator.

14. In a scale, a pendulum counterbalance, an indicator, an actuator therefor operated by the counterbalance, and a cam having a surface of a particular length coacting with the actuator during the travel of the pendulum, the surface having an intermediate portion sloping oppositely towards each end of said length of cam surface.

In testimony whereof I hereto affix my signature.

WILLIAM N. GILBERT.